(12) United States Patent
Morvant

(10) Patent No.: US 6,267,383 B1
(45) Date of Patent: Jul. 31, 2001

(54) V-SHAPED SEAL WITH ANTI-EXTRUSION SECTION

(76) Inventor: John D. Morvant, 1922 Grand Valley Dr., Houston, TX (US) 77090

( * ) Notice: Subject to any disclaimer, the term of this patent is extended or adjusted under 35 U.S.C. 154(b) by 0 days.

(21) Appl. No.: 09/000,893

(22) Filed: Dec. 30, 1997

Related U.S. Application Data

(63) Continuation of application No. 08/230,135, filed on Apr. 20, 1994, now abandoned, which is a continuation of application No. 07/950,820, filed on Sep. 24, 1992, now Pat. No. 5,306,021, which is a continuation of application No. 07/512,734, filed on May 21, 1990, now abandoned, which is a continuation of application No. 06/833,690, filed on Feb. 25, 1986, now abandoned.

(51) Int. Cl.$^7$ .................. F16J 9/20; F16J 15/32
(52) U.S. Cl. ............... 277/439; 277/530; 277/532; 277/536; 277/553; 277/564; 277/584
(58) Field of Search ............... 277/439, 530, 277/532, 536, 540, 541, 553, 564, 566, 584

(56) References Cited

U.S. PATENT DOCUMENTS

| | | | |
|---|---|---|---|
| 2,844,421 | * | 7/1958 | Hayman . |
| 2,927,830 | * | 3/1960 | Workman . |
| 3,810,639 | * | 5/1974 | Scannell . |
| 4,013,299 | * | 3/1977 | Scott . |
| 4,040,636 | * | 8/1977 | Albertson et al. . |
| 4,219,204 | * | 8/1980 | Pippert . |
| 4,281,590 | * | 8/1981 | Weaver . |
| 4,473,231 | * | 9/1984 | Tilton et al. . |
| 5,287,951 | * | 2/1994 | Voit et al. . |
| 5,306,021 | * | 4/1994 | Morvant . |
| 5,493,951 | * | 2/1996 | Harrison . |
| 5,551,703 | * | 9/1996 | Morvant . |

FOREIGN PATENT DOCUMENTS

0506965 * 11/1954 (CA) .

* cited by examiner

Primary Examiner—James R. Brittain
Assistant Examiner—John L. Beres
(74) Attorney, Agent, or Firm—David M. Ostfeld

(57) ABSTRACT

A sealing-device having a body section and an anti-extrusion section is shown, the body section being disposed on top of the anti-extrusion section. The body section includes sealing surfaces for enclosures in which the sealing device is located. the anti-extrusion section prevents extrusion of the body section.

18 Claims, 4 Drawing Sheets

FIG. 1
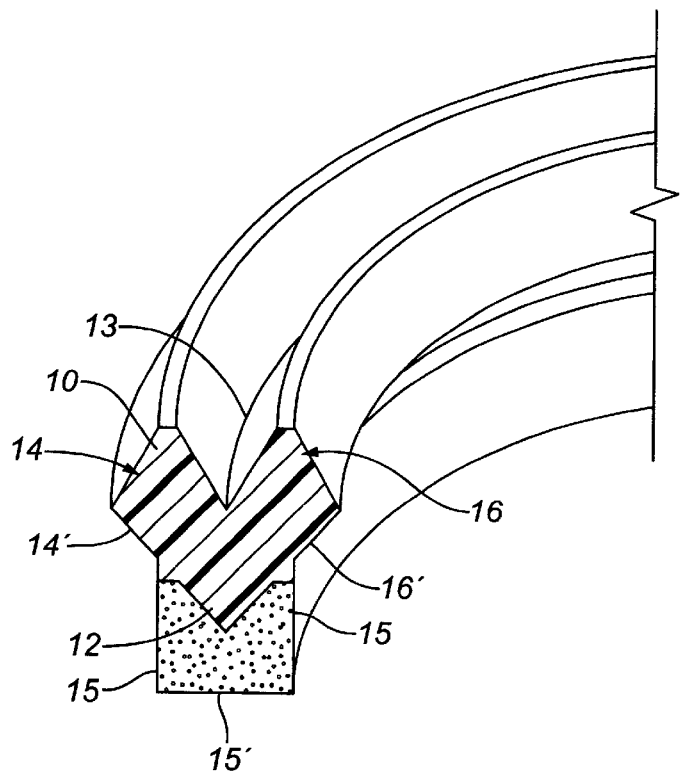
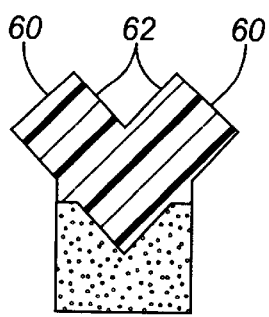
FIG. 6A
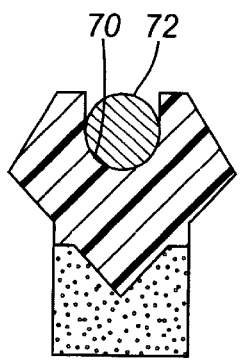
FIG. 6B
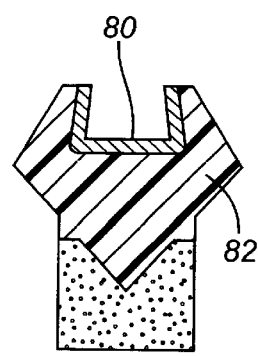
FIG. 6C

V-SHAPED SEAL WITH ANTI-EXTRUSION SECTION

This is a continuation of application Ser. No. 08/230,135, filed Apr. 20, 1994 now abandoned, which is a continuation of application Ser. No. 07/950,820, filed Sep. 24, 1992 now U.S. Pat. No. 5,306,021, which is a continuation of application Ser. No. 07/512,734, filed May 21, 1990 now abandoned, which is a continuation of application Ser. No. 06/833,690, filed Feb. 25, 1986 now abandoned.

TECHNICAL FIELD

The present invention relates to machinery packing and, more particularly, to a composite seal ring structure.

BACKGROUND ART

Seals have been used to isolate fluids at various pressures and temperatures. Such seals have existed for use in packing rings, seal rings; piston rings, and gland structures in industrial equipment such as cylinders, pumps and valves and in oilfield equipment such as downhole tools and surface equipment, requiring seals, for example, against high pressure and low pressure liquids and gases, for reciprocating rods, for pistons, for valves and for other applications.

However, such seals may be eroded and/or extruded or destroyed for machinery equipment wherein sealing needs to be established at the most severe sealing environments, which include seal gland design, pressures, fluid medics and temperatures.

Such seals, whether of the dynamic or static type, are usually made, or have portions made, of materials which, to some extent, are resilient or at least deformable. In order to seal effectively, it is not necessary, but could be possible, that the sealing device be placed under some compressive loading between the components of the assembly to be sealed. Because of the compressing load, there is a tendency for portions of deformable seals to be subjected to extrusion forces which will either distort the seal and impair its effectiveness as a seal or, in more severe cases, force portions of the seal into clearances between the components to be sealed.

In an attempt to overcame this extrusion problem, workers in the field have resorted to various techniques. One common practice employed to prevent such extrusion is the use of a back-up ring of knitted mesh as shown in U.S. Pat. No. 4,219,204. Additionally, seals having the seal lip configuration with an insert discussed below are also known in the art and are manufactured by Parker Seal Company, polypac seal.

DISCLOSURE OF THE INVENTION

A composite seal ring is disclosed having an elastomeric section and a mesh anti-extrusion backup device in which the elastomeric section is seated. Compatible lip and backup materials are disclosed to service the desired sealing environments. The design of the seal lip of the elastomeric section provides sufficient "preloading" or squeeze in the gland area to initiate sealing. The face of the sealing lip is "V" shaped which provides a pressure sensitive area to effect a seal in elevated pressures which can replace an entire V a packing set or other seals. The anti extension device is molded of a knitted wire mesh and provides a backup to the sealing lip in high pressures and extreme clearance gaps between the seal gland and the bore or rod which reduces the requirement for elaborate metal or plastic anti-extrusion devices.

BRIEF DESCRIPTION OF THE DRAWINGS

For a further understanding of the nature and objects of the present invention, reference is made to the following drawings in which like parts are given like reference numerals, and wherein:

FIG. 1 is an enlarged perspective view, partially cut away for purposes of illustration, of a packing ring constructed according to one embodiment of the present invention:

FIG. 6A, 6B and 6C are fragmentary elevations, partially in section, of other types of packing rings of the preferred embodiment of the present invention

PREFERRED AND ALTERNATE MODES FOR CARRYING OUT THE INVENTION

Figure 5:
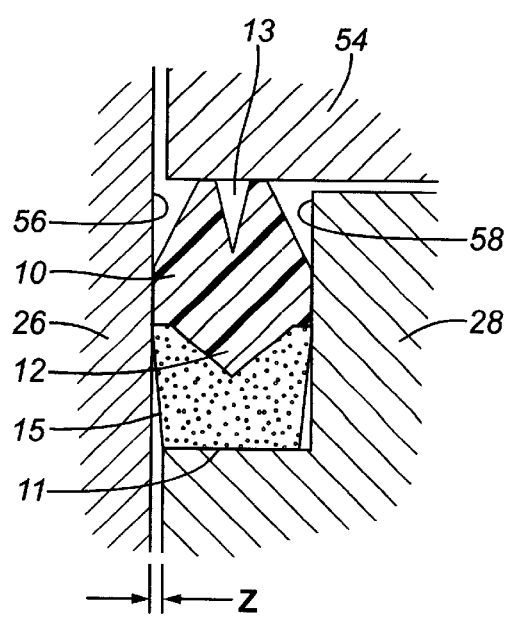
FIG. 5 is a fragmentary view of the seal ring of FIG. 4 in one type of structural context.
Figure 7:
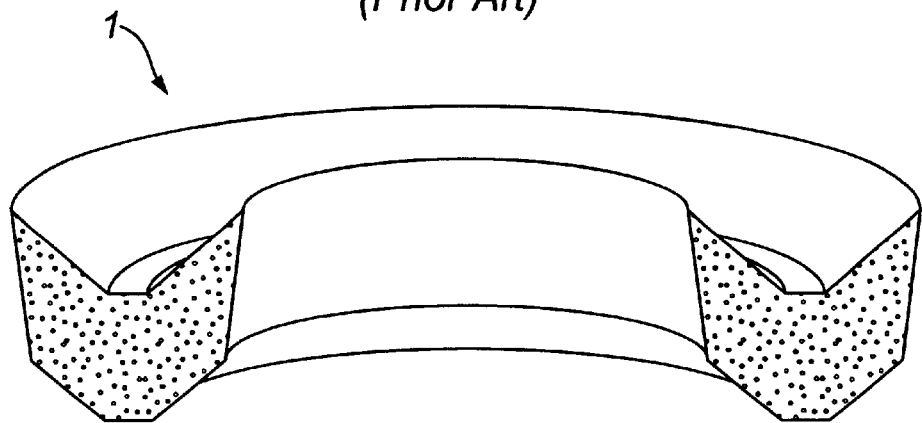
FIG. 7 is a cross sectional view of a first prior art ring.
Figure 8:
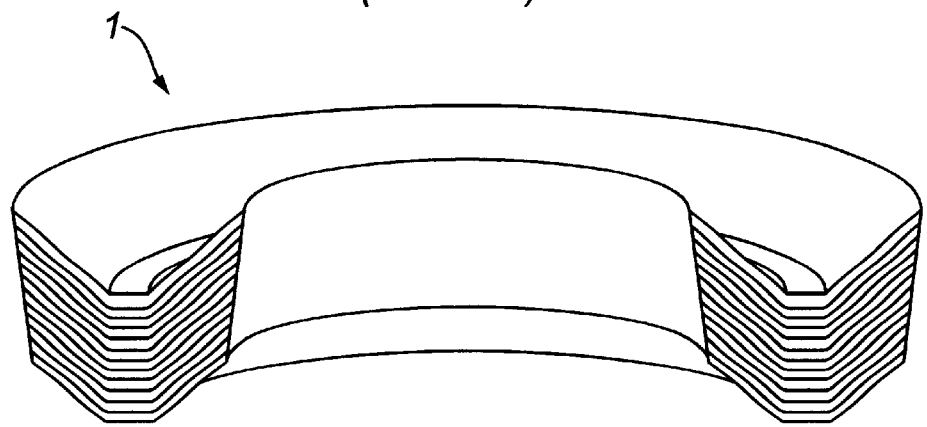
FIG. 8 is a cross sectional view of a second prior art ring.
Figure 9:
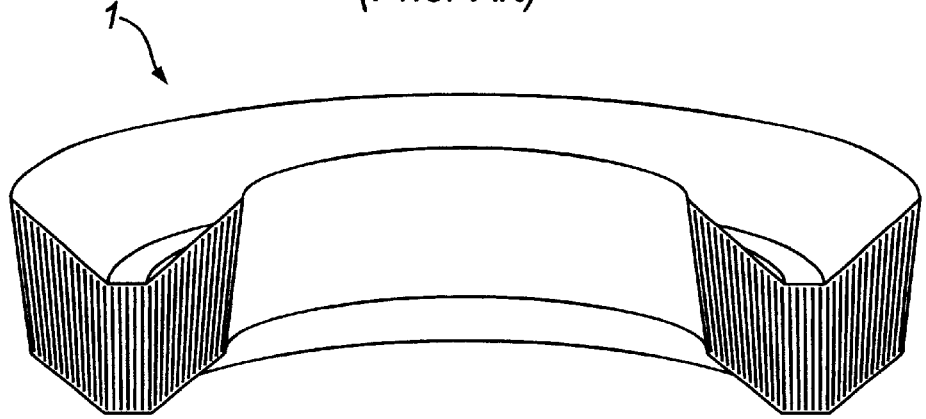
FIG. 9 is a cross sectional view of a third prior art ring.

Referring to FIG. 1 and FIG. 5, there is shown a seal ring comprising a seal lip member 10 seated on an anti-extrusion device member 11.

The cross-section of the anti-extrusion device member 11 includes a V shaped recessed area 12 which is formed by sides 15 of anti-extrusion device member 11. Sides 15 are, preferably, symmetrical. A bottom 15', preferably flat, forms the lower portion of anti-extrusion device member 11. Recessed V shape area 12 is preferably undercut as shown such that the anti-extrusion device member 11 is pressure sensitive. The anti-extrusion device member 11 also includes a knitted wire mesh of any metallic or non-metallic material that can be drawn into a 0.014 diameter wire, or less. Such knitted wire mesh is that which is well known in the art, such as shown by Metex catalogs. A particularly preferred type of knitted material consists of a continuous series of interlocking loops knitted in a tubular form. In forming the anti-extrusion sections, the knitted material is pre-formed in configuration and is usually mechanically bonded to the seal or packing as discussed below. The anti-extrusion section can use a binder such as an elastomeric material, or a phenolic material or some other such synthetic or natural material, either thermosetting or thermoplastic in nature, which can be coated on the knitted material to form a binder for the knitted material, adding chemical adhesion to the mechanical bonding. The knitted material used in forming the anti-extrusion section can be fabricated from a wire or filament. Typically such metals include stainless steel, aluminum, copper, brass, etc. As noted, the knitted material need not be of metal. The anti-extrusion device is a compression molded knitted wire mesh product. This device can be manufactured by any metallic or non-metallic material that be drawn into a 0.014 diameter wire or less. Selection of material is primarily dependent on the application whether static or dynamic. Density of the molded anti-extrusion device will vary according to application but usually is recommended to be between 50%–75% of the metal of the anti-extrusion ring, determined by volume and weight.

The seal lip member 10 includes an upper V shaped recessed area 13 formed between beveled lip areas 14, 16. Beveled lip areas 14, 16 are preferably, but not necessarily, symmetrical and form the inner and outer periphery of seal lip member 10. V shaped recessed, area 13 is preferably undercut as shown such as that beveled lip areas 14, 16 are pressure sensitive and self energizing for sealing. Further, the lower exterior outer surfaces 14', 16' of beveled lip areas 14, 16 are sized to be received in V shape recessed area 12 and abuts V shaped recessed area 12.

The seal lip member 10 is, preferably, mechanically bonded at the lower extension surfaces 14', 16' of beveled lip areas 14, 16 to V shaped recessed area 12 of the anti-extrusion device member 11, which bonding may be enhanced by chemical coating of anti-extrusion device member 11 which reacts chemically with the material of seal lip member 10 as discussed above.

The material used in forming the seal lip member 10 can comprise a thermoplastic material, a thermosetting material, a fabric reinforced thermosetting material, a fabric reinforced thermoplastic material, an elastomer, a thermoplastic elastomer, a mixed thermoplastic/thermosetting material or various combinations of the above. As a further example of the breadth of materials possible, the term "thermosetting", as used herein, applies to those resins, generally synthetic in nature, which solidify or set on heating and can not be remelted. Non-limiting examples of such thermosetting resins include phenolics, amino resins, polyesters, epoxies, silicones and the like. As another example of the breadth of materials possible, the term "thermoplastic", as used herein, applies to resins, generally synthetic in nature, that may soften by heat and then regain their control properties upon cooling. Non-limiting examples of such thermoplastic materials include nylon, polyethylene, polypropylene, cellulose and acrylic resins, polyurethane, synthetic rubbers, teflon, nylon, ryton, polycarbonates and the like. The lip member 10 may also comprise a thermosetting or thermoplastic or thermoelastomer or elastomer material reinforced with a fibrous material which can be in the form of a cloth or as a chopped or flecked filler. The term "fabric or fibrous material", as used herein, refers to any material obtained by weaving or other such techniques wherein the matrix comprises a lattice work or web of thread-like elements. Numerous materials fall into this class such as, for example, cotton, asbestos, fiberglass, nylon, polyesters, linen, rayon and the like. Furthermore, blends of various materials such as cotton-polyester fabrics, rayon-polyester fabrics, and the like may be employed. The durometer hardness of the material of the seal lip member 10 is preferably between 70–90 t but should not be considered limited to such 70 to 90 durometer. As to the preferred material of which the seal ring lip member 10 is comprised, it is recommended that a rubber or rubber type polymer be used for the seal lip member 10 which has a 50–95 durometer reading on the Shore A durometer scale. The durometer of the material chosen will be such that the desired sealing effect can be satisfactorily obtained. The seal lip member 10 conceivably can be metal, or as discussed above, plastics such as that going under the trade name Teflon.

Figure 2:
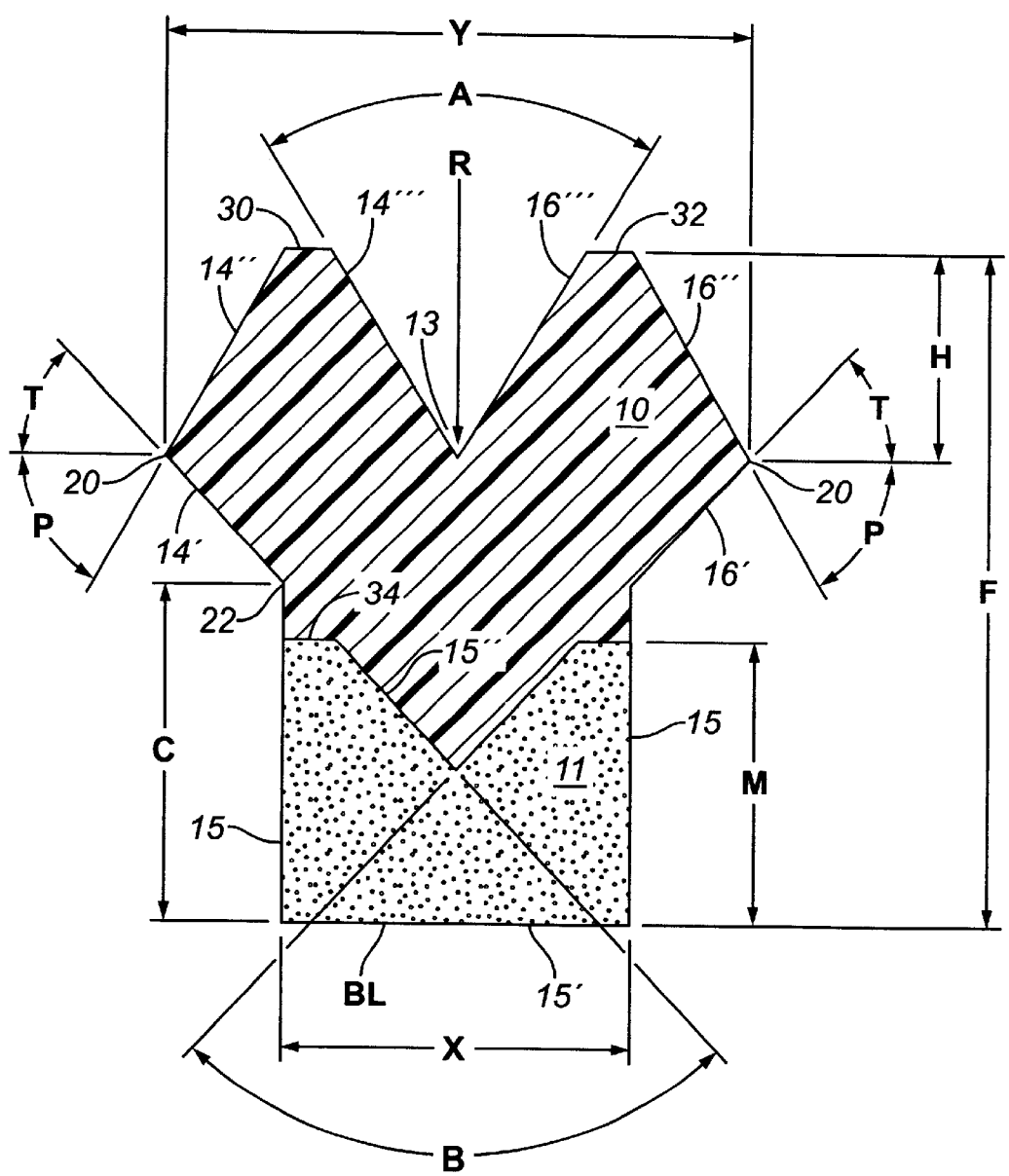
FIG. 2 is a fragmentary transverse section of the packing ring in FIG. 1.

FIG. 2 shows an enlarged transverse section of the seal ring in FIG. 1 of the present invention. The seal ring member being illustrated is enlarged in section, so that the dimensions and angles involved in a preferred embodiment of the invention may be better illustrated. The first angles to be defined are angles T and P. Angle T is the exterior upper angle formed by (1) the plane which includes substantially the locus of points at the intersection 20 of the upper exterior outer surfaces 14", 16" respectively, with the lower exterior outer surfaces 14', 16' of beveled lip areas 14, 16 and (2) the surface projection formed substantially by extending the surface of either of the lower exterior surfaces 14', 16'. Angle P is the exterior lower angle formed by (1) the plane which includes substantially the locus of points at the intersection 20 of the upper extension outer surfaces 14", 16", respectively, with the lower extension outer surfaces 14', 16' of beveled lip areas 14, 16 and (2) the surface projection formed substantially by extending downwardly the surface of either upper exterior outer surface 14", 16". Of the two angles in the beveled lip area 14, 16, the angle P is the larger, depending on application and may vary at a range of 30° to 40°, whereas angle T will usually only vary in a range of 20° to 30°.

The second angles to be defined are the angles A and B. Angle A is the angle of the V shaped recessed area 13 of seal lip member 10. Angle A is the upwardly or downwardly facing angle formed by the intersection of the surface projections of the walls of the exterior, inner surfaces 14''', 16''' of beveled lip areas 14, 16, surfaces 14''', 16''' forming the V shaped recessed area 13. Angle B is the angle of the V shaped recessed area 12 of the anti-extrusion device member 11. Angle B is formed by the intersection of the surface projections of the walls of the inner surfaces 15" of sides 15, surfaces 15" forming the V shaped recessed area 12. Angles A, B will vary depending on the cross-section involved. The angles A and B have recommended ranges between 20°–90° and 30°–45°, respectively.

For purposes of dimensioning the anti-extrusion device member 71, it may be considered terminating at the upper edge 22 of sides 15, designated in FIG. 2 as dimension "C", above the surface of bottom 15', designated as the baseline "BL" in FIG. 2, of the anti-extrusion device member 11. C is of the order of 100% of the measurement M discussed below. The sides of beveled lip areas 14, 16 below surfaces 14', 16' are shown to be contiguous-with sides 15. Surfaces 14', 16' flare outwardly at angles T, P, previously described, to form the beveled lip. The beveled lip areas 14, 16 will flare outwardly so that an interference of the order of twenty-five percent exists between the seal ring member 10 and the structure 26, 28 enclosing seal ring member 10 (FIG. 5). The amount of interference will vary according to the application. Upper exterior outer surfaces 14''', 16''' and exterior inner surfaces 14", 16", respectively, terminate at seal lip upper surfaces 30, 32 respectively. Seal lip upper surfaces 30, 32 are substantially the same height, labeled "H" in FIG. 2, above the locus of points at intersection 20. The suggested seal lip height at dimension H is roughly one fourth the overall height of combined seal ring 10, 11 from bottom 15' to surfaces 30, 32, designated "F" in FIG. 2.

The sides 15 of anti-extrusion device member 11 rise to a height, designated "M" in FIG. 2, above the bottom 15' and terminate in substantially level surfaces 34. Level surfaces 34 extend from sides 15 to inner surfaces 15". The dimension M of the anti-extrusion device 11 is approximately one-half the dimension F of the entire seal shown in FIG. 2. The bottom 15' has a cross sectional length which is designated as "x" in FIG. 2. The height F of the entire seal is approximately twice the cross-sectional dimension x of the anti-extrusion device member 11.

Figure 3:
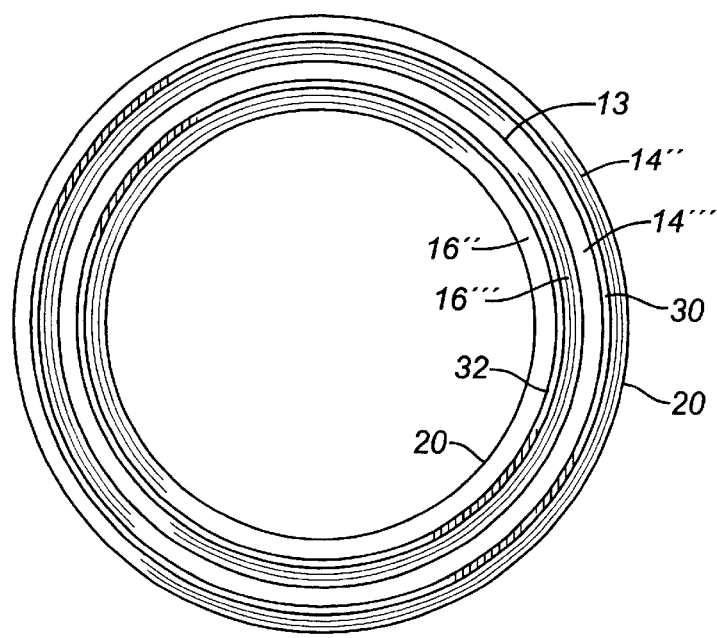
FIG. 3 is a plan view of a seal ring of the preferred embodiment oft present invention.

FIG. 3 illustrates the plan view of seal lip member 10 of FIGS. 1 and 2, wherein the member 10 is continuous and uninterrupted.

Figure 4:
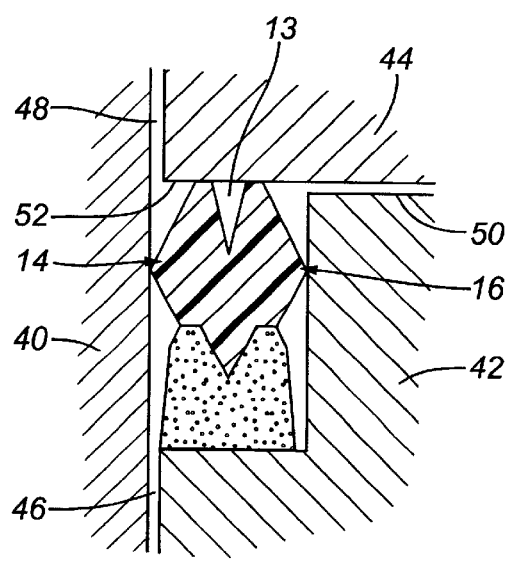
FIG. 4 is a transverse section of the composite ring of FIG. 1 when installed in a seal gland.

FIG. 4 indicates the application of the seal ring invention of FIGS. 1–3 being disposed in a structure formed by sides 40, 42 and top member 44 to seal off high pressure fluid in slit 46 from leaking into slits 48, 50, which are at lower pressure. As shown in FIG. 4, surfaces 30, 32 are compressed by portion of the surface 52 of top member 44 to provide the seal desired. In FIG. 4, without pressure, the surfaces 30, 32 of seal lips 14, 16 are energized by cross sectional squeeze. At zero to low pressure the surfaces 30, 32 maintain the seal and the anti-extrusion device provides stability being energized by fluid pressure in the recessed area 13 which accentuates the seal at the beveled lip areas 14, 16.

FIG. 5 indicates the application of the invention of FIGS. 1–3 being disposed in a structure formed by sides 26, 28 and top 54 to seal by elevated system pressure compression. At elevated pressures the recessed area in the seal 13 transforms energy to the beveled lip areas in the seal lips 14, 16 and to the recessed area 12 in the anti-extrusion device 11. The energy exerted on the recessed area 12 in the anti-extrusion device member 11 flares the molded knitted wire mesh at the sides 15 to the boundaries 56, 58 of the gland to provide the seal desired. The recessed area of the anti-extrusion device 11 flares out to include the soft seal lip 10 at elevated pressures.

The anti-extrusion device 11 can be manufactured at any density to accommodate applications that have severe sealing gland design (clearance between rod and seal gland), pressures, fluid media, and temperature. In severe pressure applications, the anti-extrusion device actually reforms to conform to the structure containing the seal. This is unique in that the density of the knitted wire mesh will increase to resemble a solid metal backup with zero clearance. The dimension "z". shown in FIG. 5, will approach zero at elevated pressures. In summary, at elevated pressures sufficient to deform the anti-extrusion device, a new seal as such has been created that will include the soft seal lip material 10 by the reformed anti-extrusion device 11. This seal will be compressed to boundaries 56, 58 and maintain shape at boundaries 56 ,58 even after pressure is reduced.

FIG. 6 shows several different seal lip members 10 that can be used. For example in FIG. 6A, the inner and outer upper sides 60, 62 meet at a peak instead of the flat portions 30, 32 of FIG. 2. FIG. 6B shows a more circular shape 70 instead of the V shape 13 of FIG. 2 and further shows an elastomeric "O" ring 72 used as a spring to separate the sides. FIG. 6C shows an oblong shape 80 instead of V shape 13 of FIG. 2 and a metal spring 82 to separate the sides.

While in the description given above and as depicted in the drawings, the seals or packings have been described with particular reference to annular members such as a packing, it is to be understood that the invention is not so limited. Thus, it is not necessary that the generally non-metallic body section be annular in configuration. Depending on the type of usage to which the seal or packing is put, the non-metallic body section can have virtually any configuration. For example, the body section can be elliptical, square, hexagonal or virtually any other shape. Whatever its shape, the body section would be provided with an anti-extrusion section or sections disposed on the non-metallic body section at points or areas subject to high extrusion forces. In general, and except in the case of an elongate strip type packing member, the sealing device, e.g. seal, packing, gasket, etc., will generally have an opening or passageway therethrough which usually is at least partially defined by at least a portion of the body section, sealing being effected in the region generally contiguous and surrounding the opening. Thus, a sealing device having a non-annular configuration could be used as a seal between the plug or cock and the body of a plug valve to ensure that when the valve was either in the open or closed position, there was no fluid leakage from the flow passage into the body of the valve in which the plug is mounted. In static applications, the sealing device could have a highly assymetrical configuration as for example in a gasket which had a first, relatively large generally solid body section attached to a second lesser volume body section which defined an opening, the opening in the gasket registering with similar openings in removably fixed parts so as to ensure sealing between the parts at this juncture. The anti-extrusion section(s) would be suitably disposed in such a gasket to withstand imposed extrusion forces.

Because many varying and different emodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. An anti-extrusion sealing device for use in an enclosed area subject to line fluid force, comprising:

an upper, line fluid force set extrudable body section, said upper extrudable body section having formed from an extrudable material and having an upper end, said upper end including a top in contact with the fluid force and an inner and an outer sealing surface opposing each other depending downward from said top and contacting the enclosed area subject to fluid force and said upper extrudable body section having a lower portion depending downward from said sealing surfaces;

a lower anti-extrusion section having an upper portion and a bottom, said bottom having a bottom surface, said lower anti-extrusion section in contact at said upper portion to said lower portion of said upper extrudable body section and said bottom surface abutting the enclosed area, said lower anti-extrusion section serving to resist extrusion forces acting on said sealing surfaces adjacent said lower anti-extrusion section, said lower anti-extrusion section being comprised of a knitted material, at least some of the filaments of said knitted material being metallic in nature, said upper portion having inner and outer radial edges facing the enclosed are and an upper surface having at least a partial V-shape in cross-section between said radial edges;

said upper extrudable body section having a lower end with a lower portion having a lower surface shaped for reception in said upper surface of said lower anti-extrusion section upper portion and said sealing surfaces extending radially beyond said edges prior to application of the fluid force;

said lower anti-extrusion section bottom including a portion below said V-shape upper surface of sufficient axial thickness to permit rotation of said radial edges and said upper surface so that said radial edges contact the enclosed area in response to normal fluid force applied to said upper surface, whereby upon application of the fluid force from the enclosed area upon said top, said radial edges rotate into contact with the enclosed area adjacent to said sealing surfaces, forming an anti-extrusion seal for said extrudable material of said sealing surfaces.

2. The sealing device of claim 1, wherein the shape of body section is annular.

3. The sealing device of claim 2, wherein the shape of said anti-extrusion section is annular.

4. The sealing device of claim 1, wherein said upper surface of said anti-extrusion section upper end includes a V-shape recessed area in cross section.

5. The sealing device of claim 4, wherein said V-shape recessed area has sides, said sides being symmetrical sides.

6. The sealing device of claim 4, wherein said V-shape recessed area is undercut, whereby said anti-extrusion section is pressure sensitive.

7. The sealing device of claim 4, wherein said lower surface of said lower portion of said body section has a V-shape in cross section corresponding to said V-shape recessed area of said anti-extrusion section and which abuts said V-shape recessed area of said anti-extrusion section.

8. The sealing device of claim 1, wherein said anti-extrusion section is preformed in configuration with memory of said configuration.

9. The sealing device of claim 1, wherein said sealing surface of said upper end includes an inner concave central portion and at least one V-shape outer surface, in cross section, having slanted upper and lower surfaces, which intersect at the apex of the said V.

10. The sealing device of claim 1, wherein there are two sealing surfaces at the upper end of said body section separated by a concave indentation, the sides of said sealing surfaces being sized for energizing by cross sectional squeeze.

11. The sealing device of claim 10, wherein said concave indentation has substantially a clear opening.

12. The sealing device of claim 11, wherein said sealing surfaces are energized by fluid pressure indentation.

13. The device of claim 11, wherein said concave indentation includes an "O" ring therein as a memory device.

14. The device of claim 11, wherein said concave indentation includes a spring therein as a memory device.

15. The device of claim 14, wherein said spring includes a metallic portion as a memory device.

16. The device of claim 14, wherein said spring includes a O-ring as a memory device.

17. An Anti-extrusion sealing device for use in an annularly shaped enclosed area defined by axially extending surfaces and radially extending surfaces and having a rectangular cross section, with an axial dimension greater than the radial dimension wherein normal forces from line fluid act on the anti-extrusion sealing device, comprising:

an upper extrudable body section having extrudable material and an upper end, said upper end including a top for applying the normal forces from fluids, an inner and an outer sealing surface opposing each other and depending downward from said top and contacting the enclosed area axially extending surfaces, and said upper extrudable body section having a lower portion depending downward from said sealing surfaces;

a lower anti-extrusion section having an upper portion and a bottom, said bottom having a bottom surface, said lower anti-extrusion section being in contact at said upper portion to said lower portion of said upper extrudable body section and said bottom surface abutting the enclosed area lower radial surface, said lower anti-extrusion section serving to resist extrusion forces acting on said sealing surfaces adjacent said lower anti-extrusion section, said lower anti-extrusion section being comprised of a knitted material, at least some of the filaments of said knitted material being metallic in nature, said upper portion having inner and outer radial edges facing the axial sides of the enclosed area and an upper surface having at least a partial V-shape in cross-section between said radial edges.

said upper extrudable body section having a lower end with a lower portion having a lower surface shaped for reception in said upper surface of said lower anti-extrusion section upper portion and said sealing surfaces extending radially beyond said edges prior to application of the normal forces from fluids;

said lower anti-extrusion section bottom includes a portion below said V-shape upper surface of sufficient axial thickness to permit rotation of said edges and said upper surface so that said radial edges contact the axial surfaces of the enclosed area adjacent said sealing surfaces which contact the axial surfaces of the enclosed area upon the application of the normal forces from fluids on said top.

18. An anti-extrusion sealing device for use in an enclosed area subject to force from line fluid, comprising:

an upper extrudable body section formed from extrudable material and having an upper end, said upper end including a top in contact with the enclosed area force from fluid and an inner and an outer sealing surface on opposite sides of said upper extrudable body section depending downward from said top and contacting the enclosed area and said upper extrudable body section having a lower portion depending downwardly from said sealing surfaces;

a lower anti-extrusion section having an upper portion and a bottom, said bottom having a bottom surface, said lower anti-extrusion section being in contact at said upper portion to said lower portion of said upper extrudable body section and said bottom surface abutting the enclosed area, said lower anti-extrusion section having means for resisting extrusion forces acting on said sealing surfaces adjacent said lower anti-extrusion section, said lower anti-extrusion section being comprised of a knitted material, at least some of the filaments of said knitted material being metallic in nature, said upper portion having inner and outer radial edges facing the enclosed area and an upper surface having at least a partial V-shaped cross-section between said radial edges;

said upper extrudable body section having a lower end with a lower portion having a lower surface shaped for reception in said upper surface of said lower anti-extrusion section upper portion;

said lower anti-extrusion section bottom including a portion below said V-shaped upper surface of sufficient axial thickness to permit rotation of said radial edges and said upper surface so that said radial edges contact the enclosed area in response to fluid force applied to said upper surface, whereby upon application fluid force from the enclosed area upon said top, said radial edges rotate into contact with the enclosed area adjacent to said sealing surfaces, forming an anti-extrusion seal for said extrudable material said sealing surfaces.

* * * * *